Figure 1:
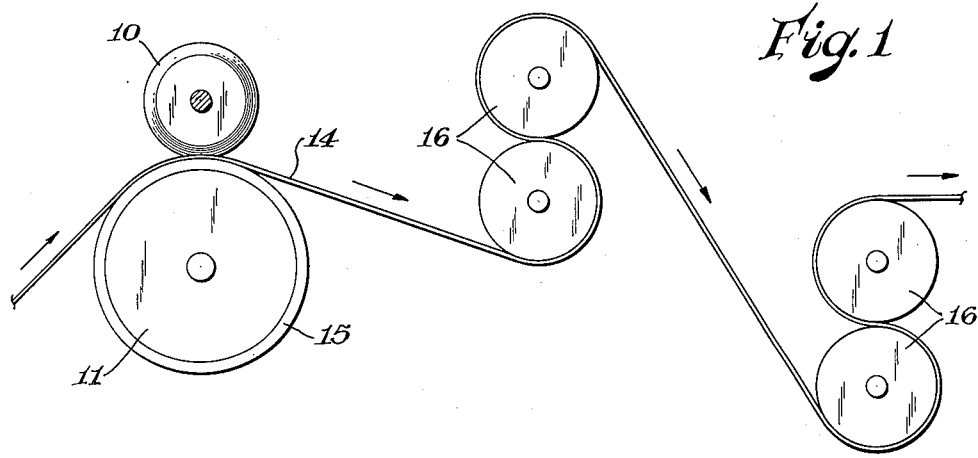

Jan. 3, 1956

R. J. ANNESSER 2,728,950

PROCESS FOR PRODUCING FIBERS FROM
FILMS OF POLYMERIC MATERIALS
Filed May 6, 1954

INVENTOR
Richard J. Annesser

BY
Griswold & Burdick
ATTORNEYS.

United States Patent Office 2,728,950
Patented Jan. 3, 1956

---

2,728,950

PROCESS FOR PRODUCING FIBERS FROM FILMS OF POLYMERIC MATERIALS

Richard J. Annesser, Midland, Mich., assignor to The Dow Chemical Company, Midland, Mich., a corporation of Delaware Application May 6, 1954, Serial No. 428,011

3 Claims. (Cl. 18—47.5)

This invention relates to fibers and filaments and to a method for making the same from polymeric materials. More particularly, it relates to methods of making such fibers and filaments from thin films of the polymeric materials.

The production of fibers and filaments by shredding films of polymeric materials has been disclosed. There are several apparent advantages to such a fiber-making technique. Films are easy to produce from such forms as polymer latexes and solutions and, once formed, films are easily handled. Fibers, on the other hand, are very weak and difficult to handle in the formative stage. All prior processes of making fibers from films have involved the shredding or fibrillation by mechanical means of unidirectionally oriented films. The staple fibers so produced were of varying denier and length depending on the degree of orientation of the film and on the amount any type of mechanical working. Such irregular fibers were difficult to process with the usual textile processing equipment into useful yarns. Continuous fibers could not be made by those prior methods. The staple fibers required several steps, such as carding and drawing, before a tow was produced.

It would be most desirable, in view of the above difficulties, to have a process for producing continuous, useful fibers and filaments from films and the provision of such a process is the principal object of this invention.

It is a further object to produce fibers having a uniform denier and orientation.

Other objects will become apparent as the description of the invention proceeds.

The objects of the invention are accomplished by a process in which a plastic film is scored or embossed thermally along parallel lines and subsequently drawn or stretched to orient the film, and finally worked to separate the film into fibers along the scored lines. The orientation also draws the fibers down to a narrower size so that uniform fibers of very thin cross-section may be produced. The fibers are continuous and thus may be immediately twisted into a yarn.

The process of the invention is not limited to any particular polymeric composition. Any polymer which may be formed into a coherent film may be employed. Preferably, normally crystalline polymers which are orientable are used, since fibers with greater strength are produced from such polymers. As typical examples of such polymers may be mentioned the copolymers of vinylidene chloride with up to about 15 per cent of another copolymerizable monomer such as vinyl chloride or acrylonitrile. Normally non-crystalline polymeric compositions may also be employed although with certain obvious restrictions. Such polymers cannot be oriented to an end point and the fibers produced have inherently lower tensile strengths than those of the crystalline polymers.

Although the invention is not limited to producing any particular size of fibers and filaments, practical considerations will restrict the operation of the process to those sizes normally encountered in the fiber and filament producing art. Thus, fibers and filaments smaller than 0.001 square inch in cross-section will be those that are most commonly produced. Although, larger sizes may be produced, it will usually be more practical and economical to produce such larger filaments by other well known methods, such as by extruding the filaments directly from a die.

Figure 3:
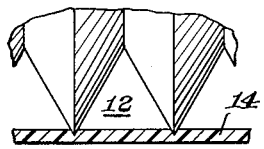
Figure 2:
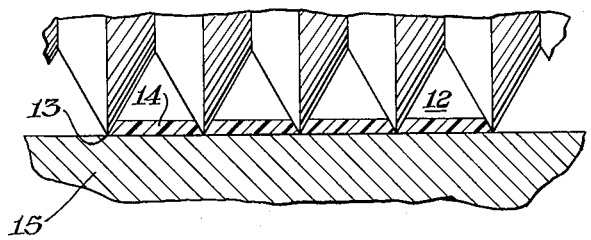

The operation of the process will be made more apparent from the drawings and the following description which illustrates a preferred embodiment of an apparatus which may be used in the process. In the drawings, Fig. 1 represents a diagrammatic side elevation of the apparatus;

Fig. 2 represents a highly magnified view of the film being scored completely through; and, Fig. 3 represents a highly magnified view of the film being scored partially through.

The apparatus comprises, in cooperation with a continuous film supply, a means of scoring the film, a means for separating the film into fibers, and a means for orienting the fibers.

The film may be supplied to the apparatus by any known means, such as from a roll of film wrapped about a mandrel. It should be immediately apparent that the length of the fibers will be the same as the length of film, so that if continuous fibers are desired a continuous supply of film must be provided. This can be done by feeding freshly made film from a continuous belt film casting device into the subsequent parts of the apparatus.

The scoring apparatus consists of a pair of rolls, one roll 10 being grooved about its periphery, the other being a resilient backing roll 11. The surface of the grooved scoring roll 10 is preferably made of a hard metal to minimize wear. The grooves 12 are parallel about the periphery and are separated from one another by sharp ridges 13 which are capable of scoring or cutting into film 14. The depth and width of the grooves 12 will depend on the thickness of the film 14 being cut and the width of the strips desired.

The scoring roll 10 is heated and adjusted so that the film is heated along parallel lines by the hot ridges 13 contacting the film 14 and making only a slight indentation in the film 14. The temperature at which the roll 10 should be maintained will vary depending on the particular polymeric film composition being acted on. Usually this will be between 110° C. and 210° C., and the optimum temperature for any film may be easily determined. When such a scored film 14 is later subjected to mechanical working it will split along those scored lines. It has been found that the film 14 must be scored to a depth of at least half its thickness for easy separation of the strips. It is even possible to score the film 14 completely through although in the subsequent steps it is then necessary to handle a tow of individual strips instead of a connected sheet.

The backing roll 11 has a firm but resilient surface 15 to allow the grooved roll 10 to score the film 14 without damage to the sharp ridges 13. Preferably, the surface of the backing roll 11 is made of hard rubber or other rubber-like substance. Since the scoring roll 10 is heated to emboss the film 14, the backing roll 11 is water-cooled to limit the site of thermal scoring to a fine line on the scoring roll side of the film.

Following the scoring rolls (10 and 11) the scored film passes over two sets of snubber rolls 16, the second set of which operates with a higher surface speed than that of the first set, to provide a room temperature orientation of the scored film, after which the film may be stretched at a higher temperature by differential rolls (not shown) operating at still greater surface speeds. The temperature at which the hot stretching should be conducted will vary depending on the polymeric material employed. Such temperatures are either known or may be easily determined by simple preliminary experiment. The scored film is subjected to mechanical working such as brushing, following the hot orientation. The mechanical working separates the scored film into continuous fibers along the scored lines. The fibers may then be collected, or processed in any suitable manner.

The fibers produced in accordance with the process of this invention are continuous, are of very uniform cross-section, and are easily reproduced. The prior methods of producing fibers from film resulted in staple fibers of uneven lengths, and whose cross-section depended on local sites of orientation and on the amount and kind of mechanical working.

The process of the invention was employed to reduce to fibers a latex cast film made from a polymer consisting of 97 per cent vinylidene chloride and 3 per cent acrylonitrile. The film was 0.001 inch in thickness and the scoring ridges of the grooved roll were spaced 1 mm. apart. The film was fed past the scoring roll at a rate of 15 feet per minute and the grooved roll was set to cut through the film. The 1 mm. strips were subjected to a 2 to 1 stretch at room temperature by the snubber rolls followed by a 4 to 1 stretch by the differential rolls at a temperature of 110° C. The tow thus produced was twisted into a strong, useful cord.

In a similar manner, some of the same film as above was embossed along parallel lines by the grooved roll. The pressure of the grooved roll on the film was two to three pounds per linear inch of roll contact. The temperature of the grooved roll was maintained at 150° C. and the backing roll was water-cooled. The rate of film travel was 15 feet per minute. The embossed film was given a room temperature stretch of 2 to 1 followed by a 4 to 1 stretch at a temperature of 150° C. The embossed oriented film was then passed between a pair of rotating brushes which split the film into fibers along the embossed lines, giving a continuous tow which was useful in yarn making operations.

I claim:

1. The method which comprises supplying a coherent and unoriented plastic film to the nip between a cold roll having a yieldable surface and a heated roll having closely spaced parallel narrow circular ridges on its periphery, while applying sufficient pressure to the latter roll to score the film to at least half its thickness, stretching the so-scored film to effect longitudinal orientation, and mechanically separating the stretched product into fibers along the scored lines.

2. The method claimed in claim 1, wherein the unoriented film is composed of a normally crystalline vinylidene chloride copolymer.

3. The method claimed in claim 2, wherein the orientation is effected, after scoring, by stretching at room temperature followed by stretching at a higher temperature below the melting point of the composition.

References Cited in the file of this patent

UNITED STATES PATENTS

| 2,150,155 | Davis | Mar. 14, 1939 |
| 2,328,063 | Dodge | Aug. 31, 1943 |
| 2,344,511 | Harder | Mar. 21, 1944 |
| 2,614,288 | Chavannes | Oct. 21, 1952 |